United States Patent [19]
Pahr

[11] Patent Number: 5,659,945
[45] Date of Patent: Aug. 26, 1997

[54] METHOD OF ASSEMBLING A SMALL DISTANCE READ/WRITE HEAD WITH INHERENTLY LOW MISTRACKING

[75] Inventor: Per Olaf Pahr, Lier, Norway

[73] Assignee: Tandberg Data Storage A/S, Oslo, Norway

[21] Appl. No.: 399,130

[22] Filed: Mar. 6, 1995

Related U.S. Application Data

[63] Continuation-in-part of Ser. No. 82,363, Jun. 28, 1993, abandoned.

[51] Int. Cl.$^6$ .................................................. G11B 5/127
[52] U.S. Cl. ........................ 29/603.04; 29/603.09
[58] Field of Search ............................ 29/603.04, 603.06, 29/603.09, 603.1; 360/104, 113, 121, 125, 126

[56] References Cited

U.S. PATENT DOCUMENTS

| | | | |
|---|---|---|---|
| 4,719,527 | 1/1988 | Yoshisato et al. | 360/121 |
| 5,128,811 | 7/1992 | Van Gestel | 360/119 |
| 5,218,498 | 6/1993 | Jagielinski | 360/113 |
| 5,379,165 | 1/1995 | Pahr | 360/78.02 |

FOREIGN PATENT DOCUMENTS

| | | |
|---|---|---|
| 0 197 158 | 10/1986 | European Pat. Off. . |
| 0 456 316 | 11/1991 | European Pat. Off. . |
| 0 617 424 | 9/1994 | European Pat. Off. . |

OTHER PUBLICATIONS

The Fourier Transform and Its Applications, Bracewell, (1986), pp. 44–45.
The Fourier Integral and Its Applications, Papoulis, (1962), pp. 244–245, 252–253.
Patent Abstracts of Japan, vol. 7, No. 212 (P–224), Japanese Application No. 810207900.
Patent Abstracts of Japan, vol. 11, No. 201 (P–590), Japanese Application No. 850160716.

*Primary Examiner*—P. W. Echols
*Attorney, Agent, or Firm*—Hill, Steadman & Simpson

[57] ABSTRACT

A magnetic head assembly, for use in a tape drive wherein a tape is moved past the head assembly in a longitudinal direction and the tape exhibits transverse tape movement cross-correlated by obtaining repeated measurements at the same longitudinal position of the tape, and wherein a minimum longitudinal distance exists for which the cross-correlation is maintained, has a carrier with first and second gap and coil arrangements disposed on the carrier. The respective gaps in the first and second gap and coil arrangements are disposed on the carrier separated by a spacing which is less than the aforementioned minimum longitudinal distance. If one gap and coil arrangement is used as a write arrangement, and the other gap and coil arrangement is used as a read arrangement for verifying the writing of data by the write arrangement, tracking errors are minimized, or substantially avoided, because the write and read arrangements are so close to each other as to be effectively at the same position in the context of the cross-correlated transverse tape movements.

6 Claims, 8 Drawing Sheets

FIG. 9

METHOD OF ASSEMBLING A SMALL DISTANCE READ/WRITE HEAD WITH INHERENTLY LOW MISTRACKING

SPECIFICATION

This application is a continuation-in-part of application Ser. No. 08/082,363, filed Jun. 28, 1993, now abandoned.

BACKGROUND OF THE INVENTION

1. Field of the Invention

The present invention is directed to a magnetic head assembly of the type used in a high-speed tape drive to transfer data to and from a magnetic tape moving past the magnetic head assembly in the drive.

2. Description of the Prior Art and Related Applications

In high-speed tape drives wherein data is transferred to and from a magnetic tape moving at high speed in the drive, using a magnetic head assembly, the data are written in a large number of closely adjacent, or overlapping, data tracks. The tracks extend in a longitudinal direction parallel to the direction of tape transport, and are disposed side-by-side in a direction perpendicular to the transport direction. In such systems, it is known to employ the read head of the magnetic head assembly to verify the data which has been written in a pass by the write head, so that any errors in tracking or data transfer can be immediately identified, and corrective steps can be taken. A system wherein the verification takes place in the same pass as the writing of the data is known as a read-while-write system.

It has been observed and experimentally confirmed by the present inventor that if a track is recorded on a magnetic tape in a belt-driven cartridge using a write head, and if the tape in the cartridge is then rewound to exactly the same position as where the recording began and is then driven, the tape will exhibit nearly the same transverse tape movements (TTM) as the tape exhibited when the first track was recorded. Such transverse tape movements occur in a direction substantially perpendicular to the direction of tape transport. By means of a servo track or tape edge monitoring, the write head can thus be made to precisely follow these transverse movements so that the "guard bands" between tracks can be made small to prevent overwriting from track-to-track (or, if there is intentional track-to-track overlap, this overlap can be precisely controlled). The details of this phenomenon, and supporting experimental data, are set forth in U.S. Pat. No. 5,379,165, the teachings of which are incorporated herein by reference. The aforementioned phenomenon can be summarized as a recognition of the fact that there are strong cross-correlations among TTM waveforms obtained from repeated measurements at the same longitudinal position on the tape. Cross-correlation between two functions $f_1(t)$ and $f_2(t)$ is a well-known mathematical and engineering tool and is defined, for example, in the book by Papoulis, Anthanasios: "The Fourier Integral and its Application," McGraw-Hill Book Company, 1962, page 252, as the integral:

$$\rho_{1,2}(t) = \lim(1/2T) \cdot \int_{-T}^{T} f_1(\tau) f_2(t+\tau) d\tau$$

Figure 1:
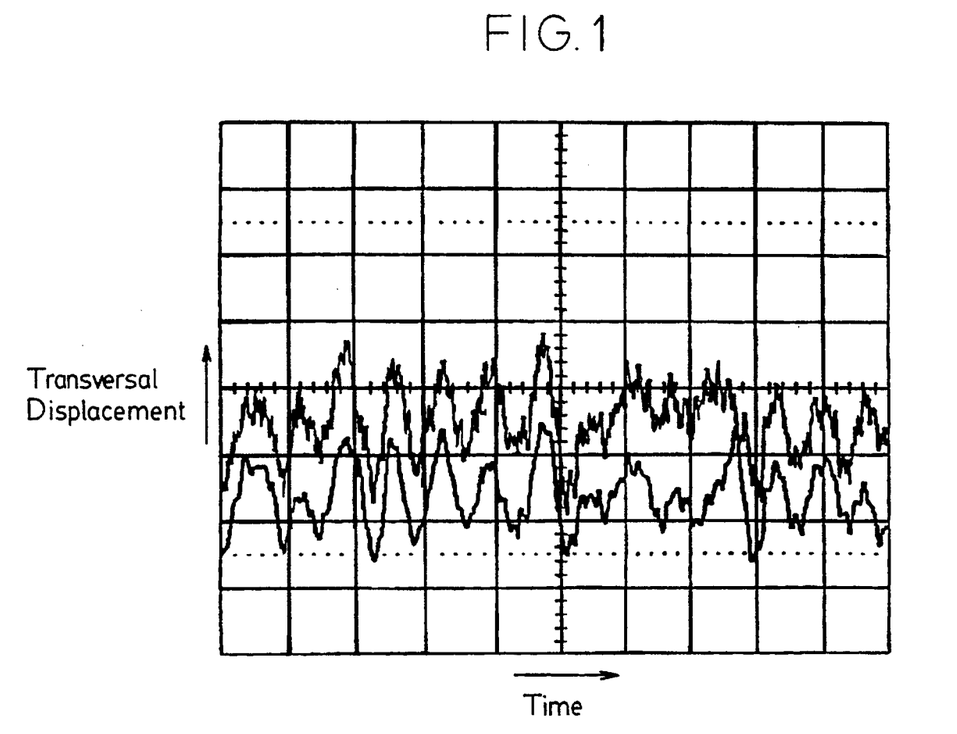
FIG. 1, as noted above, is a graphical representation of TTM waveforms with cross-correlation in a tape drive.

A graphical representation of such a TTM waveform as described in the aforementioned U.S. Pat. No. 5,379,166 is shown in FIG. 1. The upper waveform in FIG. 1 was the first one measured. It is designated $f_1(t)$. The lower one was the 1000th measured, it is designated $f_{1000}(t)$. The notation for the cross-correlation corresponding to the measurement reproduced in FIG. 1 is therefore $\rho_{1,1000}(t)$, and it is very large. A slow shift or drift in the transverse direction over a relatively long time, as seen in FIG. 1, will not much disturb the basic temporal shape of $\rho_{1,1000}(t)$. Even when sudden, unpredictable but not too large changes take place, for example, due to external mechanical vibrations or duration-limited and amplitude-limited shocks to which the tape drive is subjected, the temporal TTM waveform of the cartridge is maintained and the resulting TTM is a superposition of this waveform and the external one.

In conventional read-while-write head assemblies, a relatively long spacing exists between the write and read gaps, primarily for the purpose of avoiding crosstalk or other interference between the gaps. This relatively long distance results in a phase shift or phase difference between the TTM waveforms respectively measured at the position of the write gap and at the position of the read gap. In such conventional head assemblies, therefore, the inherent tracking repeatability of the write gap, upon playback of a previously recorded track, cannot be utilized to its fullest extent, since the read gap is not located at the same position as the write gap was located at the time the data was written, due to the aforementioned phase shift.

Moreover, the cross-correlation among TTM waveforms obtained from repeated measurements at the same longitudinal position of the tape ceases to exist, or is at least not reliably predictable, for very short TTM wavelengths. This is caused by random TTM stemming from physical phenomena other than "weaving" caused by the rotating parts of the cartridge, which gives rise to the TTM. Such random TTM may result, for example, from transverse-mode "string" vibrations of the tape, in the same way as the well-known longitudinal-mode Instantaneous Speed Variations (ISV) of the tape are caused by random frictional forces and the dynamics of the running tape. The minimum longitudinal distance at which cross-correlation among TTM waveforms can be seen will be referred to herein as the correlation distance, designated $D_{corr}$.

SUMMARY OF THE INVENTION

It is an object of the present invention to provide a magnetic head assembly for undertaking the best possible read gap tracking in a high-speed tape drive wherein the respective gaps of the write and read heads are disposed so closely together that, in the context of transverse tape movements, they can be considered to be at the same position.

The above object is achieved in accordance with the principles of the present invention in a magnetic head assembly wherein the respective gaps of the write and read heads on a carrier are spaced a distance from each other which is less than the cross-correlation distance for the transverse tape movements.

Typically, the aforementioned cross-correlation distance, below which the predictability or repeatability of transverse tape movements no longer holds, is within a range of about 2 millimeters to about 3 millimeters. In conventional read-while-write head assemblies, the gaps of the respective heads have intentionally not been placed so close together as to be at or less than this distance, because of the concern over crosstalk or other interference arising between the gap and coil arrangement which is used for reading and the gap and coil arrangement which is used for writing. In accordance with the principles of the present invention, a magnetic head assembly wherein the gaps are spaced a distance from each other which is less than the cross-correlation distance is achieved in one embodiment by a back-to-back arrangement of two thin-film heads, separated by a layer of shielding to prevent crosstalk or other interference between the two thin-film arrangements. The shielding is formed by a copper deposit or copper alloy disposed between the two thin-film arrangements, and connected to ground.

In another embodiment, the write gaps and the read gaps are located along the same gap line.

DESCRIPTION OF THE PREFERRED EMBODIMENTS

Figure 4:
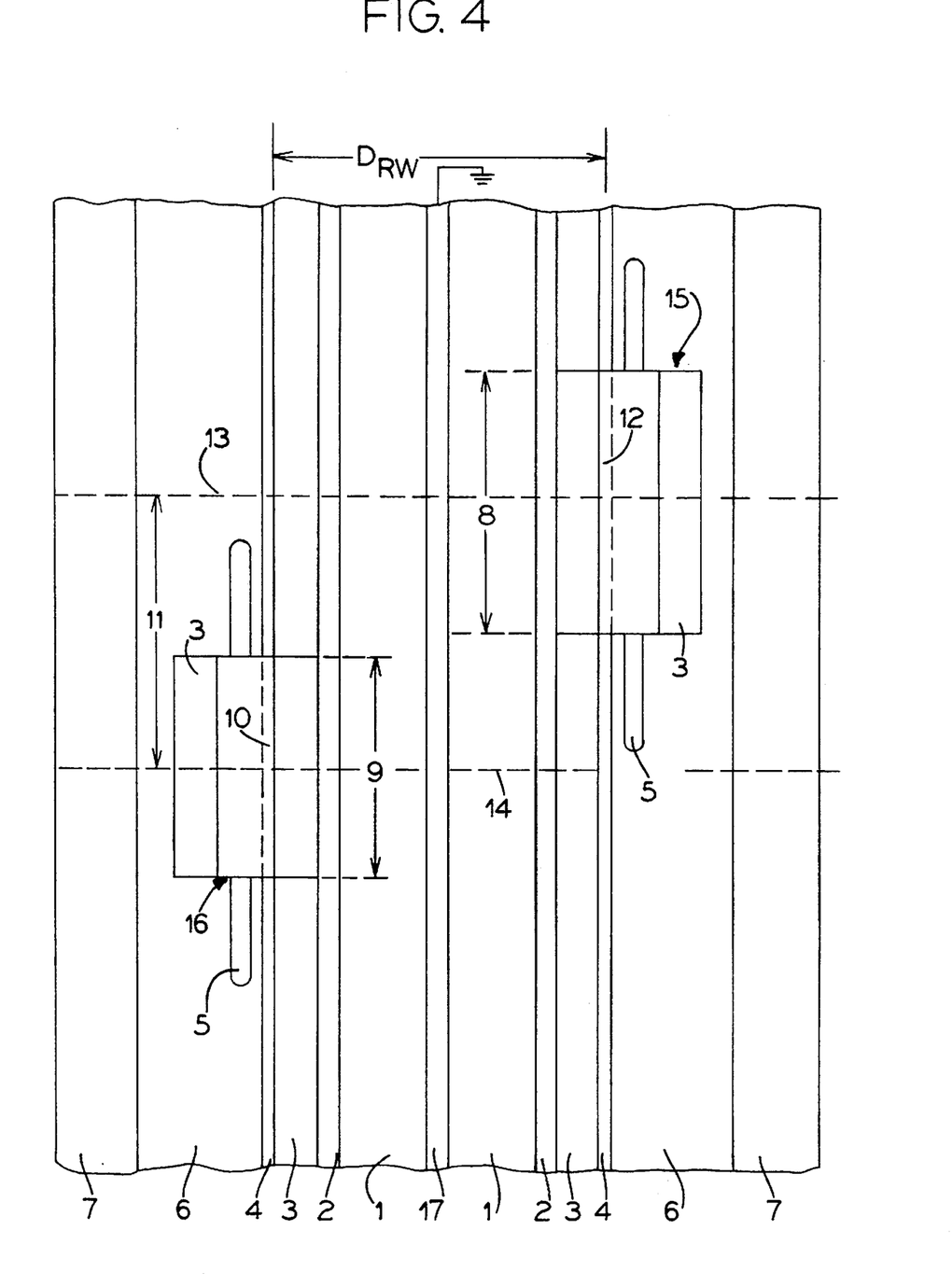
FIG. 4 is a plan view of a first embodiment of a magnetic head assembly constructed in accordance with the principles of the present invention.
Figure 5:
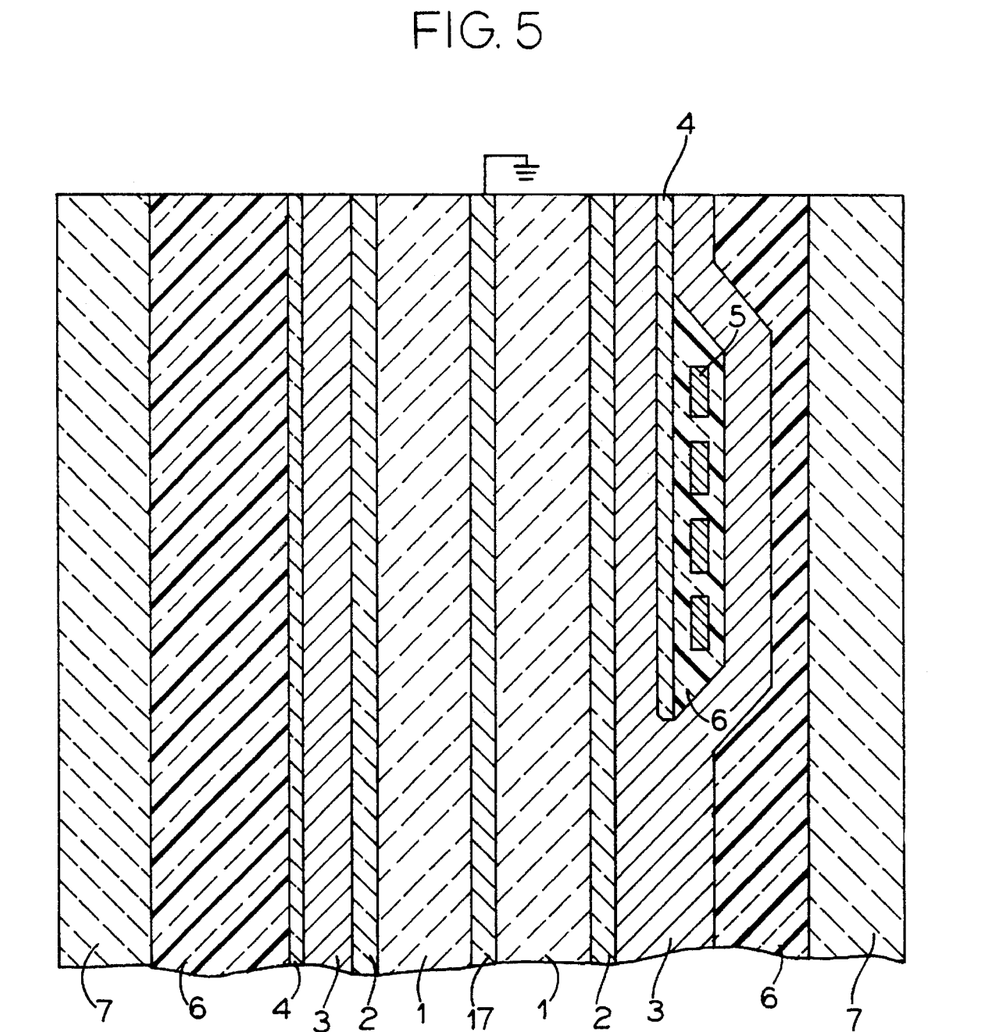
FIG. 5 is a sectional view taken along line 13 in FIG. 4.

A first embodiment of a magnetic head assembly constructed in accordance with the principles of the present invention is shown in plan and sectional views in FIGS. 4 and 5. The magnetic head assembly shown therein, as well as in the other embodiments, is for use as a write/read head of the read-while-write (R-w-R) type. The head assembly can be used for track verification as explained in co-pending Tandberg Data application Ser. No. 08/037,903, filed in the United States Patent and Trademark Office on Mar. 26, 1993 ("Head System Suitable for Magnetic or Optical High-Density Recording Devices," Solhjell et al.).

Before describing the structure of the various embodiments of the magnetic head assembly, a description of the physical mechanism which causes the loss of correlation generally discussed above will be described.

The most important mechanism resulting in the loss of correlation is a correlation loss which results because the read gap in known drive systems, such as the Quarter-Inch Cartridge (QIC) system which has heretofore been standard, is located ⅓ of an inch downstream of the write gap. If the "wavelength" of the written track movements with respect to the tape edge is ⅔ of an inch, a maximum error will occur. This wavelength can be designated $\lambda_0$, with $k_0=2\pi/\lambda_0$ being the corresponding spatial frequency, and A being the amplitude of the movement. The write gap will record a waveform in the track which is $A\sin(kx)$. When this undulating track is attempted to be read, the read head will lag by half a wavelength, and the path described by the read gap will follow the curve $A\sin(kx-\pi)=-A\sin(kx)$. Therefore, the mistracking will be $A\sin(kx)$ minus $-A\sin(kx)=2A\sin(kx)$. With a tape speed of 120 IPS, the critical frequency is 180 Hz, where phase shift causes a doubling of peak deviations. The write gap tracks perfectly in this model; the read gap is "off" by twice the tape movement amplitude. This model can be generalized for all wavelengths, both below and above the lowest critical wavelength described above. The phase lag is $2\pi D_{rw}/\lambda$, wherein $D_\lambda$ is the distance between the read and write gaps. Even if the phase lag corresponds to 1/16 of a period, for 120 IPS and 22.5 Hz, the error will be noticeable. If at the same time it so happens that the actual TTM has its maximum at this frequency at 120 IPS, this will account for most of the dynamic error.

The mathematical model for the error amplitude $A_{err}$ can be represented as follows:

$$A_{err}(k,x,\Phi)=A_{TTM}\sin(kx)-A_{TTM}\sin(kx-\Phi) \quad (1)$$

$$A_{err}(k,x,\Phi)=A_{TTM}\sin(kx)(1-\cos\Phi)+A_{TTM}\cos(kx)(\sin\Phi). \quad (2)$$

The maximum error occurs when the derivative of the error is 0, i.e., $d/dx(A_{err}(k,x,\Phi))=0$, which means $$d/dx(A_{err}(k,x,\Phi))=kA_{TTM}(1-\cos\Phi)\cos(kx)-kA_{TTM}\sin(kx)\sin(\Phi)=0. \quad (3)$$

The product $kx_{max}=\arctan((1-\cos\Phi)/\sin\Phi)$, and the maximum error can be found by inserting this value for $kx_{max}$ into the equation for $A_{err}(k,x,\Phi)$.

Figure 2:
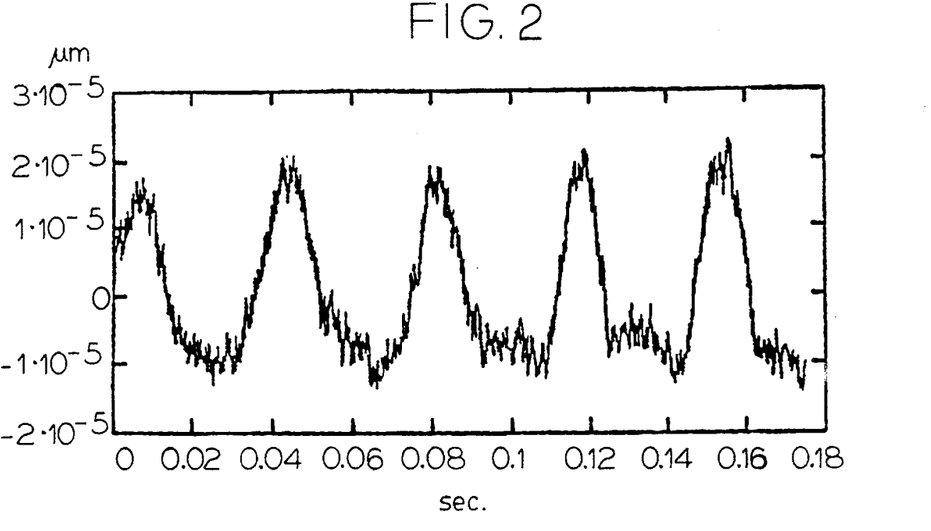
FIG. 2 shows a time-domain waveform for a typical TTM, for use in explaining the invention.
Figure 3:
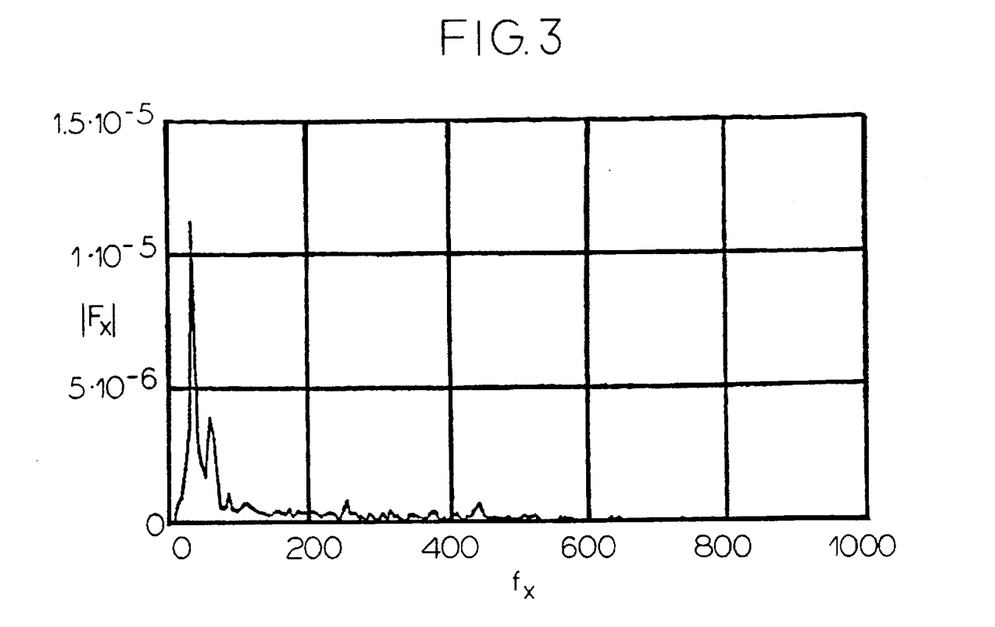
FIG. 3 is a fast Fourier transform (FFT) of the TTM waveform of FIG. 2.

As an example for applying the above model, FIG. 2 shows a time-domain waveform for a typical TTM, with the vertical scale being in micrometers and the horizontal scale in seconds. FIG. 3 shows the corresponding fast Fourier transform $F_x$ of this waveform, designated $f_x$ in FIG. 3. As can be seen from FIG. 3, the 26 Hz component has a peak amplitude of about 11.5 micrometers. For 26 Hz and a tape speed of 120 IPS, a written wavelength is 4.615 inches and ⅓ inch read head lag corresponds to a phase lag of 26°. Inserting these values into the formula for $kx_{max}$ yields 13° as the phase position at which the maximum error occurs. This is as expected, because the maximum error always occurs at half the phase error angle. Inserting 13° and 26° into the formula for $A_{err}(k,x,\Phi)$ shows:

$$A_{err}(k,x,\Phi)=(11.5\ \mu m)(\sin 13°)(1-\cos 26°)+(11.5\ \mu m)\cos 3°\sin 26°=5.17\ \mu m.$$

One can thus see that even for a small amplitude of 11.5 μm and a phase lag of 26°, tracking error can arise which may be large enough to cause mistracking.

Looking closely at the temporal waveforms in FIG. 1 or FIG. 2, it can be seen that there is also random short-wavelength noise added. This is further confirmed by FIG. 3 in which the frequency spectrum of the waveform in FIG. 2 is shown. For example, in FIG. 3, there is a noise spectrum from about 300 Hz to about 400 Hz, which is lower than the highest harmonic frequency component of the waveform, which can be seen at approximately 440 Hz. As noted earlier, these noise components are caused by random TTM stemming from physical phenomena other than "weaving" caused by the rotating parts of the cartridge, which give rise to periodic TTM waveforms and also waveforms of slowly changing periods due to the continuous unwinding and winding of tape in the cartridge. Random TTM waveforms may result, for example, from transverse-mode "string" vibrations of the tape, in the same way as the well-known longitudinal-mode Instantaneous Speed Variations (ISV) of the tape are caused by random frictional forces and the dynamics of the running tape.

Therefore, if one takes the Fourier transform of the waveforms: $f_1(t) \Leftrightarrow F_1(j\omega)$ and $f_{1000}(t) \Leftrightarrow F_{1000}(j\omega)$ shown in FIG. 1 (or even waveforms extended over a longer time interval 2T than shown in FIG. 1), and multiplies the transforms by an ideal (magnitude one, phase zero) narrow bandpass transfer function $H_{BP}(j\omega)$ from $\omega_1$ to $\omega_2$ and centered around the highest characteristic frequency component of the cartridge (440 Hz in FIG. 3), one forms the product:

$$F_1(j\omega) \cdot H_{BP}(j\omega) \cdot F_{1000}(j\omega) \cdot H_{BP}(j\omega) = F_{1,BP}(j\omega) \cdot F_{1000,BP}(j\omega)$$

wherein $F_{1,BP}(j\omega)$ and $F_{1,000,BP}(j\omega)$ are the narrow-bandpass-filtered transforms.

In the context of correlations, one can consider the narrow-band transforms $F_{1,BP}(j\omega)$ and $F_{1,000,BP}(j\omega)$ basically as representing either sine-waves or cosine waves; the latter can be chosen for simplicity. Further, since multiplication in the frequency domain corresponds to convolution in the time domain and since convolving a cosine wave yields a cosine wave, a new cross-correlation function can be defined (see Papoulis, page 244) by finding the inverse Fourier transform of the frequency-domain product:

$$\rho_{1,1000,BP}(t) = (1/2\pi) \cdot \int_{\omega_1}^{\omega_2} F_{1,BP}(j\omega) \cdot F_{1,000,BP}(j\omega)\, d\omega.$$

Details of this procedure of harmonic component separation when evaluating correlation functions can also be found in Bracewell, Ronald N.: "The Fourier Transform and Its Application," 2nd edition, McGraw-Hill Book Company, 1986, page 45.

If no noise were present, then, in the ideal case, $f_1(t) = f_{1000}(t)$. Then the cross-correlation $\rho_{1,1000,BP}(t)$ will be identical to the auto-correlation function of $f_1(t)$, which can be designated $\rho_{f1,BP}(t)$. The auto-correlation function of a cosine wave $f_1(t)$, is itself a cosine wave with the same period as $f_1(t)$. If $f_1(t)$ on the other hand was a sine wave, this does not matter. The auto-correlation function of a sine wave $f_1(t)$ is also a cosine wave with the same period as $f_1(t)$. This ideal case is therefore the "best case" in terms of cross-correlation.

One can therefore conclude that the highest frequency components in the TTM waveforms determine the highest resolutions obtainable in the cross-correlation between the TTM waveforms. In accordance with the present invention the minimum cross-correlation distance, $D_{corr}$ is defined as the distance corresponding to the positive part of the auto-correlation $\rho_{f1,BP}(t)$ which is nearest to the origin, from $-0.25T$ to $0$ and from $0$ to $+0.25T$, where "T" is the period of $\rho_{f1,BP}(t)$. In this region, corresponding to a phase shift of $+/-90°$, positive correlation is assured. Further, since the highest harmonic components of the TTM waveforms are most likely among the ones having the smallest amplitudes, they have the largest relative portion of noise added. For these highest frequency components in the TTM waveform, the highest possible cross-correlation will therefore never occur in practice.

In this discussion time was used as the variable when discussing $D_{corr}$. It will, of course, be transformable to length by direct scaling with the tape velocity. The lower harmonic components of the TTM waveforms have less noise added, relatively. These components are the most important ones. By choosing the distance between the write and read gaps to be less than $D_{corr}$, a good cross-correlation is obtained for all of the most important frequency components. The definition of $D_{corr}$ given above will therefore be a safe and good one to choose as a design criterion for the maximum distance between the write and read gaps.

It will be understood that in the method described above, identifying the harmonic (component) with the highest component frequency is the same as identifying the harmonic with the shortest component wavelength, and either approach can be undertaken. The distance $D_{RW}$ can thus alternatively be set at either a distance which is less than a phase shift of 90° of the harmonic having the highest frequency, or a distance which is less than one-quarter of the wavelength of that harmonic. Both approaches produce the same spacing or distance $D_{RW}$.

Another way of analyzing the maximum error is to recognize that the maximum error will occur in equation (1) above when the phase shift $\Phi$ is 180°. When $\Phi=180°$, the second term of the right side of equation (1) becomes $A_{TTM} \sin(kx-180°) = -A_{TTM} \sin(kx)$. Since this second term is subtracted from the first term, the two minus signs result in an addition of those terms, so that $$A_{err}(k,x,180°) = 2A_{TTM} \sin(kx) \qquad (4)$$

This expression, in turn, will be a maximum when $kx=90°$, in which case $A_{err} = 2A_{TTM}$.

The analysis which was undertaken above with respect to the fast Fourier transform shown in FIG. 3 can be undertaken for any of the higher harmonics which are also shown in FIG. 3, because these harmonics will also arise from one or more of the rotating parts in the drive system (see the aforementioned U.S. Pat. No. 5,379,165). Looking at FIG. 3, it can be seen that there is a small peak between 400 Hz and 500 Hz, located at approximately 440 Hz. In the example of FIG. 3, therefore, 440 Hz is the highest characteristic frequency of the cartridge which arises from the rotating parts. Again assuming a tape speed of 120 IPS, this results in a wavelength $\lambda = 120$ IPS/440 Hz$=0.273$"$=6.93$ mm. As explained above, the minimum cross-correlation distance $D_{corr}$ is defined as $D_{corr} = \lambda/4$. In this example, $D_{corr} = 1.7$ mm. It will be the smallest distance for which cross-correlation among measured TTM waveforms can be found. Therefore, the distance between the write and read gaps, $D_{RW}$, should be designed as less than 1.7 mm in this example.

The above analysis therefore demonstrates another manner by which the distance between the write and read heads can be set. In this approach, a time-domain waveform for the TTM exhibited by a tape in a given drive system is obtained, of the type shown in FIG. 2. A spectral analysis of this waveform is then undertaken, such as by generating the corresponding fast Fourier transform thereof, as shown in FIG. 3. From the spectral analysis, the highest characteristic frequency of the drive system arising from the rotating parts thereof is identified and the distance between the heads, i.e. $D_{RW}$, is then set as less than the distance corresponding to a phase shift of 90° at this highest characteristic frequency and tape speed.

Figure 9:
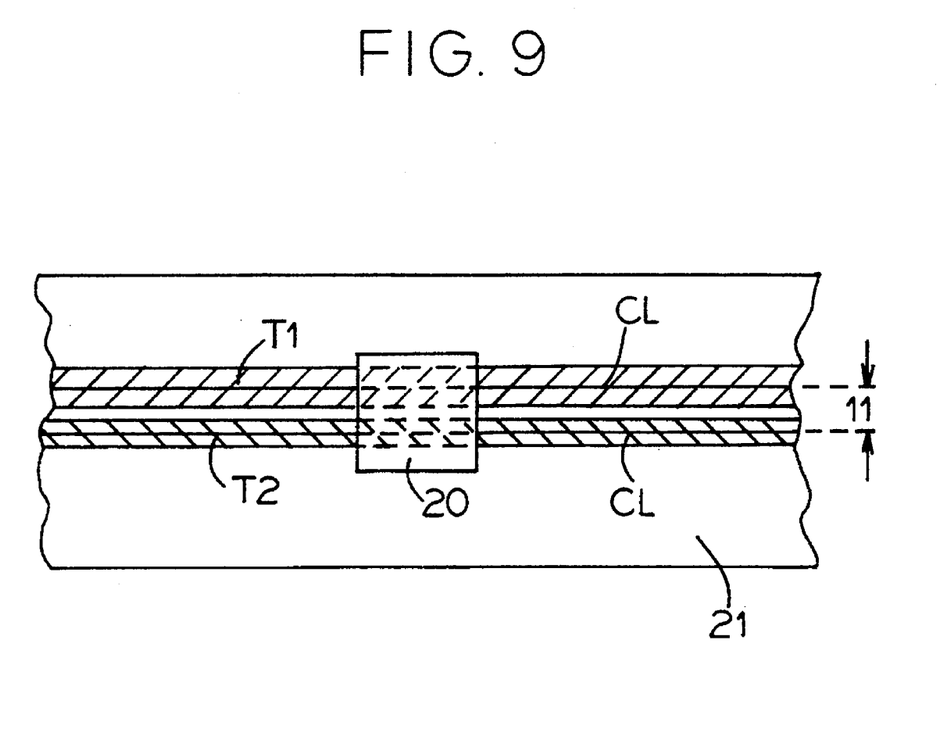
FIG. 9 schematically shows the arrangement of a magnetic head assembly of any of the above embodiments relative to a tape having adjacent data tracks therein.

Each write assembly and read assembly is formed by a gap and coil arrangement, shown in the exemplary embodiments as being constructed using thin-film magnetic technology. In the embodiment of FIGS. 4 and 5, the write assembly is generally referenced 15, and has a center line 13 extending substantially parallel to a direction of tape transport, and a width 8 extending substantially perpendicular to the center line 13. The read arrangement is generally referenced 16, and has a center line 14, substantially parallel to the center line 13, and a width 9. The width 8 of the write arrangement 15 is shown slightly larger than the width 9 of the read arrangement, as is typical for conventional head assemblies. The center lines 13 and 14 are spaced from each other by a distance 11 which is equal to the specified spacing between the respective center lines CL of two adjacent data tracks T1 and T2 on a tape 21 having a plurality of such data tracks to be used with a head assembly 20 containing the write assembly and the read assembly, as schematically shown in FIG. 9 with exaggerated spacings. Data is transferred to and from the tape using the head assembly in successively recorded tracks. In the write arrangement shown in FIG. 4, data will be written on one track by the write arrangement 15 while the data previously written on the immediately preceding track is being verified by the read arrangement 16. Since the write arrangement 15 is assumed to be writing on the $n^{th}$ track, this type of arrangement can be characterized as an "n-1" verification system.

The write arrangement 15 and the read arrangement 16 each consist of a gap and coil arrangement constructed using thin-film technology with the two arrangements being disposed back-to-back separated by a shielding or screen layer 17, which is connected to ground to minimize or substantially prevent crosstalk and other interference between the arrangements 15 and 16. Each of the arrangements 16, therefore, consists of the same sequence of layered elements, arranged mirrored relative to the shield 17. For this reason, the identical layers in each arrangement have been provided with the same reference numerals.

The arrangements 15 and 16 are built on separate substrates referenced 1 which, in combination, form a carrier for the arrangements. The substrates 1, as noted above, are separated by a shielding layer 17, which consist of a copper deposit or copper alloy. The substrates 1 may consist of alumina ($Al_2O_3$), crystallized glass, or ferrite materials. It is also possible for the read head arrangement 15 to be of a magnetoresistive design, although this is not shown in the drawings.

A layer 2 of spinned-on glass or silicon dioxide is disposed on the substrate 1 in each arrangement. Respective portions of the layer 2, forming the read head arrangement 16 and the write head arrangement 15, are covered by a magnetic film 3 of any known type. A layer 4 of silicon dioxide also is disposed on the layer 2, and also covers a portion of the magnetic film 3. The part of the layer 4 which covers the magnetic film 3 in each arrangement forms the gap of the respective arrangement, the write gap being referenced 12 and the read gap being referenced 10. Each gap is covered by an overlying extension of the magnetic film 3, spaced therefrom. In the spacing between the overlying magnetic film 3 and the portion of the layers 4 forming the respective gaps 10 and 12, one or more thin-film coils 5 are present. In the embodiment of FIGS. 4 and 5, only one such thin-film coil 5 is shown, however, a plurality of such coils may be used. The volume surrounding the thin-film coil 5 between the portion of the layer 4 and the overlying magnetic film 3 is filled with a filler material 6, such as alumina. Since the overlying portion of the magnetic film 3 is raised slightly higher from the remainder of the magnetic film 3, this height difference must be filled by filler material 6. Top and bottom substrates 7 are then applied.

Although the same filler material 6 is shown both between the magnetic film 3 and the top and bottom substrates 7 and surrounding the thin film coil 5 within the magnetic film 3, it is possible that a different type of filler material may be used to surround the thin-film coil 5 to enhance or adjust the magnetic properties, depending on particular design specifications.

The left-most edge of the gap 12 of the write arrangement 15 and the right-most edge of the gap 10 of the read arrangement 16 (in the orientation shown in FIG. 4) are separated by a spacing $D_{RW}$. This spacing $D_{RW}$ is less than or equal to the correlation distance $D_{corr}$. As also noted above, the correlation distance $D_{corr}$ is typically in the range of about 2 millimeters to about 3 millimeters, and therefore the spacing $D_{RW}$ will less than or equal to the distances in that range.

Figure 6:
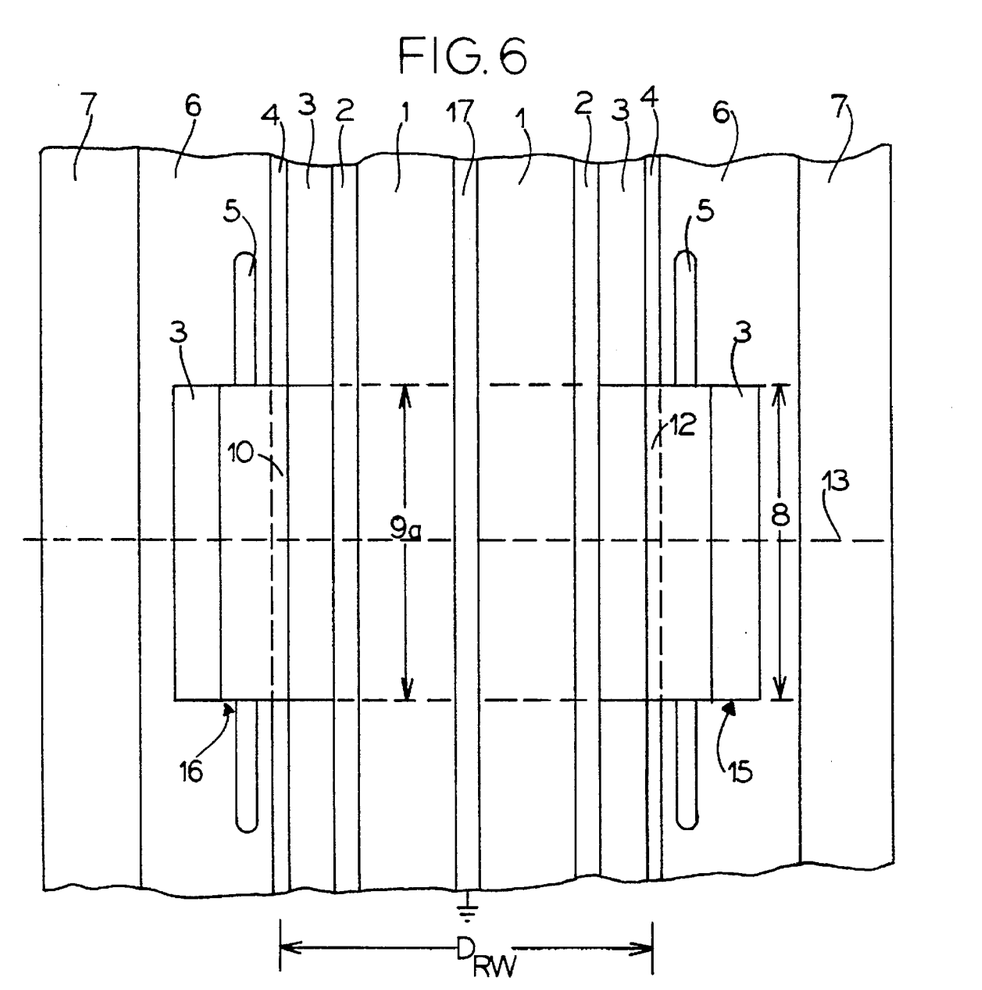
FIG. 6 is a plan view of a second embodiment of a magnetic head assembly constructed in accordance with the principles of the present invention.
Figure 7:
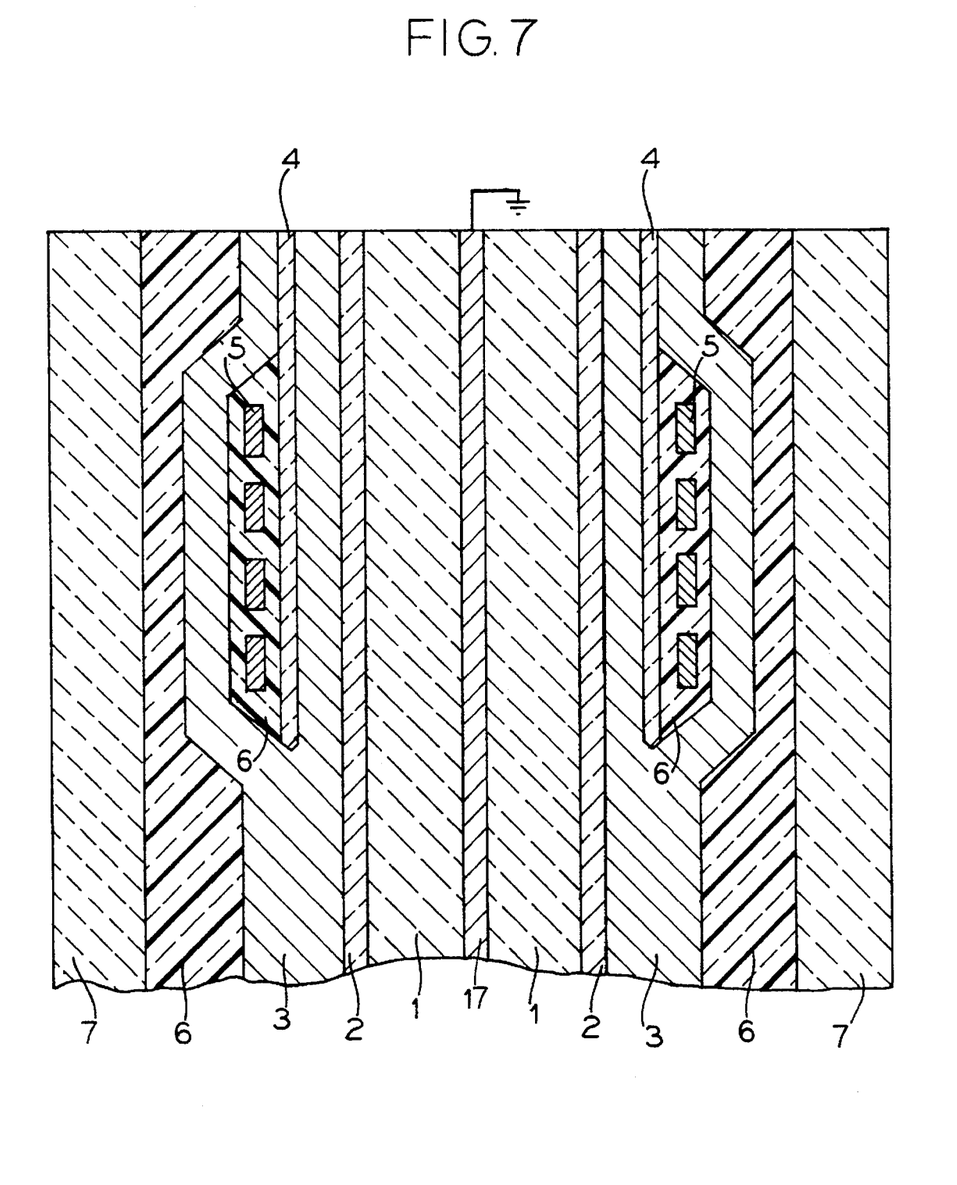
FIG. 7 is a sectional view taken along line 13 of FIG. 6.

The embodiment shown in FIGS. 6 and 7 is for conducting verification on the same data track on which data is currently being written. Therefore, the read arrangement 16 follows the write arrangement 15 on the same center line 13. The only other departure from the embodiment shown in FIGS. 4 and 5 is that in the embodiment of FIGS. 6 and 7 the read arrangement 16 has a width 9a which is equal to the width 8 of the write arrangement 15, rather than being less than the width 8. Again, the respective facing edges of the gaps 10 and 12 are spaced a distance $D_{RW}$ from each other, which is less than or equal to $D_{corr}$.

In both of the embodiments of FIGS. 4 and 5, and 6 and 7, verification should take place in the same direction as the direction the track was moving when the data thereon was previously written. In most systems in use today, writing and reading of data can take place in both forward and reverse directions of tape movement, and therefore in such systems two arrangements of the type shown in FIGS. 4 and 5, or two arrangements of the type shown in FIGS. 6 and 7, will be used, with one arrangement for the lower half of the tape (forward) and one for the upper half of the tape (reverse), for example.

Figure 8:
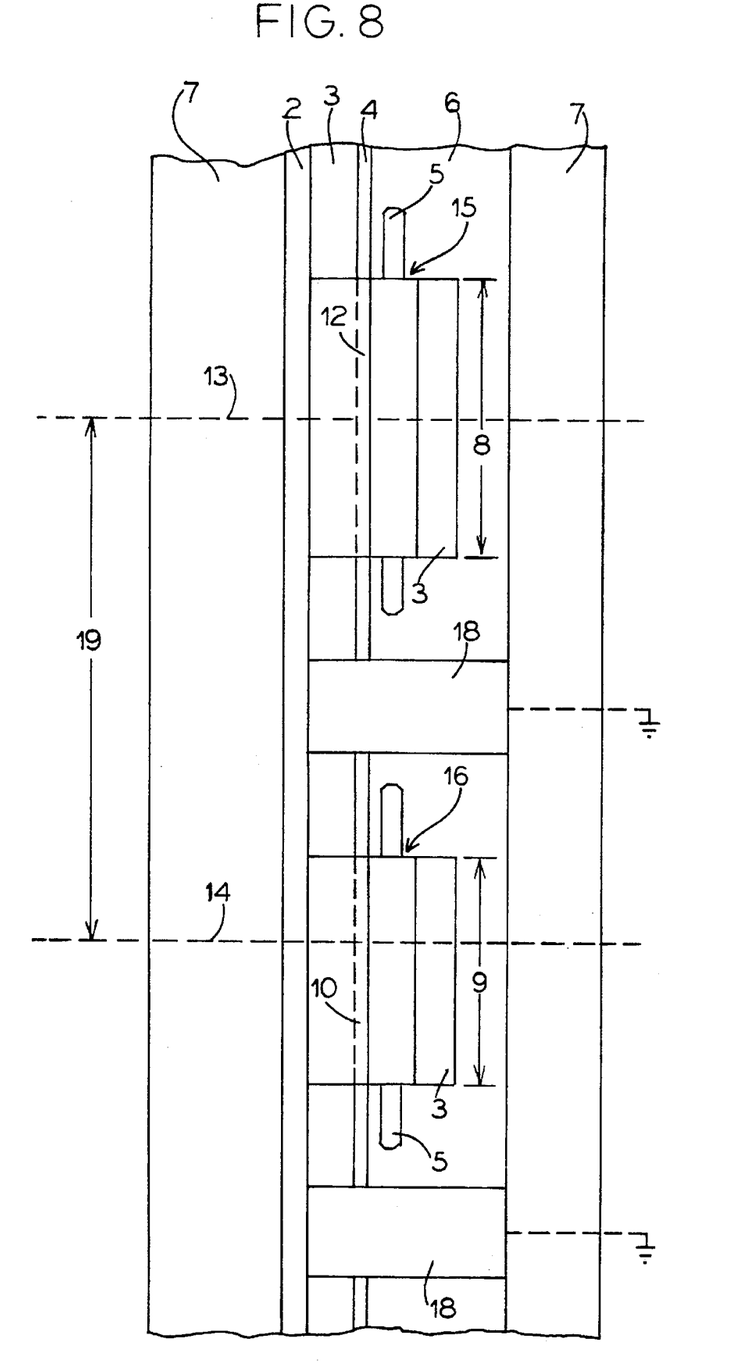
FIG. 8 is a plan view of a third embodiment of a magnetic head assembly constructed in accordance with the principles of the present invention.

As shown in the embodiment of FIG. 8, it is even possible to reduce $D_{RW}$ to zero. In this embodiment, however, since $D_{RW}=0$, a greater degree of shielding is needed and for this reason a copper deposit or copper alloy layer 18 of increased thickness is employed. The increase in the thickness of the layer 18, however, means that the arrangements 15 and 16 cannot be spaced vertically close enough together to conduct an n-1 verification, i.e., a verification on the track immediately preceding the track on which data is currently being written. The embodiment of FIG. 8, therefore, is used to conduct an n-2 verification, i.e., a verification of data on the data track which precedes the data track on which data is currently being written by two tracks. The spacing 19 between the center lines 13 and 14 therefore constitutes the specified distance between the center lines of two data tracks with one intervening data track therebetween.

The components of the embodiment of FIG. 8 are otherwise the same as previously described, and therefore identical reference symbols are used.

In all embodiments, the shielding layer 17 or 18 is connected to ground at a rear of the overall head assembly, at the location at which the thin-film layers are connected to electrical leads.

It should be noted that the track designations n-1 and n-2 refer to the same tape partition. For example, if a two-channel head of the type used in conventional tape drives such as, for example, the QIC 2GB format, were replaced with a "verify on track n-2" head assembly of the type shown in FIG. 6, two such heads must be used. The designation n-2 therefore refers to the next-nearest neighboring track in the same partition of the tape, and does not refer to the numerical recording order of the tracks.

In FIG. 4, one write gap and one read gap was shown, writing one track and verifying one track on the same pass, in accordance with the tracks shown in FIG. 9. As noted above, in accordance with the invention the distance $D_{RW}$ shall be less than the correlation distance $D_{corr}$. Since this is the essential feature of the invention, namely to obtain the best possible tracking during verification or by subsequent reading, it will be understood that other embodiments making use of this feature may exist. For example, the structure shown in FIG. 4 may be extended to an embodiment wherein four tracks are written simultaneously and four tracks are verified simultaneously. If FIG. 4 is extended in this way, the substrate shown to the right of the shield 17 in FIG. 4 will contain four write heads 15 separated with equal track pitch, as indicated by distance 11. On this right part of the assembly, there will be four centrelines 13 with sparing 11 and four write heads 15 in the same plane. The left substrate will then carry four read heads 16, disposed in the same plane, the uppermost read head being placed a distance 11 from line 13, exactly as shown in FIG. 4, and the three other read heads placed a distance 11 from each other below the upper read head.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for making a magnetic head assembly for use in a tape drive wherein a tape is moved past said assembly in a longitudinal direction, comprising the steps of:

identifying a waveform of transverse tape movements from a plurality of cross-correlated waveforms obtained by repeated measurements at a same position of said tape in said longitudinal direction;

spectrally analyzing said waveform and identifying a harmonic component of said waveform having a highest component frequency;

providing first means for transferring data relative to said tape including a first gap and a first coil;

providing second means for transferring data relative to said tape including a second gap and a second coil;

positioning said first and second means for transferring data on a common carrier with said first and second gaps being disposed at a spacing from each other on said common carrier in said longitudinal direction; and setting said spacing between said first and second gaps at a distance which is less than a phase shift of 90° of said harmonic component having the highest frequency.

2. A method as claimed in claim 1 for use with a tape on which a plurality of data tracks are successively disposed side-by-side in a direction perpendicular to said longitudinal direction, each data track having a center line, and wherein each of said first and second means for transferring data has a respective center line, and comprising the additional step of:

arranging said first and second means for transferring data on said common carrier with said center line of said first means for transferring data substantially coinciding with a center line of a first data track of said plurality of data tracks and with said center line of said second means for transferring data substantially coinciding with a center line of a further data track of said plurality of data tracks.

3. A method as claimed in claim 1 for use with a tape on which a plurality of data tracks are successively disposed side-by-side in a direction perpendicular to said longitudinal direction, each data track having a center line, and wherein each of said first and second means for transferring data has a respective center line, and comprising the additional step of:

arranging said first and second means for transferring data on said common carrier with said center line of said first means for transferring data substantially coinciding with a center line of a first data track of said plurality of data tracks and with said center line of said second means for transferring data substantially coinciding with a center line of a further data track immediately adjacent said first data track.

4. A method as claimed in claim 1 for use with a tape on which a plurality of data tracks are successively disposed side-by-side in a direction perpendicular to said longitudinal direction, each data track having a center line, and wherein each of said first and second means for transferring data has a respective center line, and comprising the additional step of:

arranging said first and second means for transferring data on said common carrier with said center line of said first means for transferring data substantially coinciding with a center line of a first data track of said plurality of data tracks and with said center line of said second means for transferring data substantially coinciding with a center line of a further data track spaced from said first data track with one data track therebetween.

5. A method as claimed in claim 1 for use with a tape on which a plurality of data tracks are successively disposed side-by-side in a direction perpendicular to said longitudinal direction, each data track having a center line, and wherein each of said first and second means for transferring data has a respective center line, and comprising the additional step of:

arranging said first and second means for transferring data on said common carrier with said center line of said first means for transferring data substantially coinciding with a center line of a first data track of said plurality of data tracks and with said centerline of said second means for transferring data substantially coinciding with said center line of said first data track.

6. A method as claimed in claim 1 wherein the step of spectrally analyzing said waveform comprises producing a Fourier transform of said waveform.

* * * * *